May 16, 1933.  C. G. WHEELAND  1,909,030
ICE MAKING TRAY
Filed April 19, 1930  2 Sheets-Sheet 1
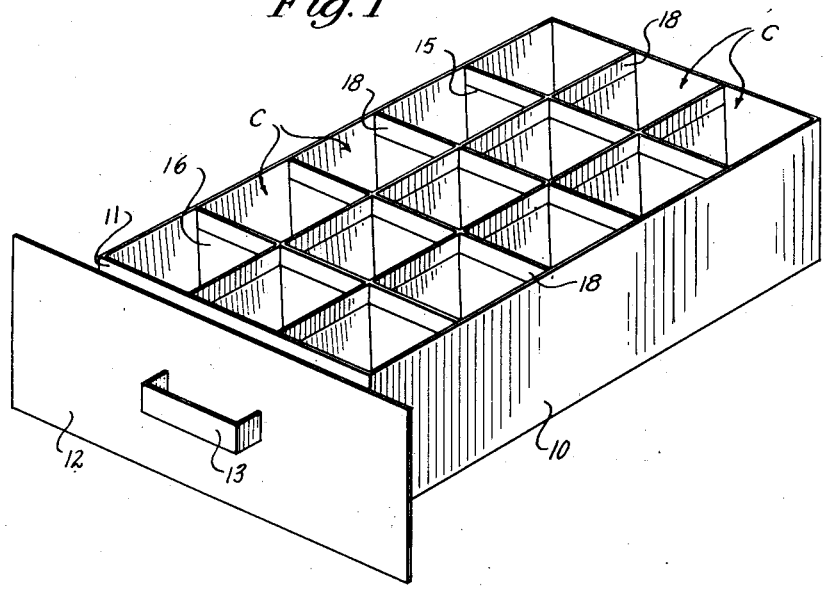
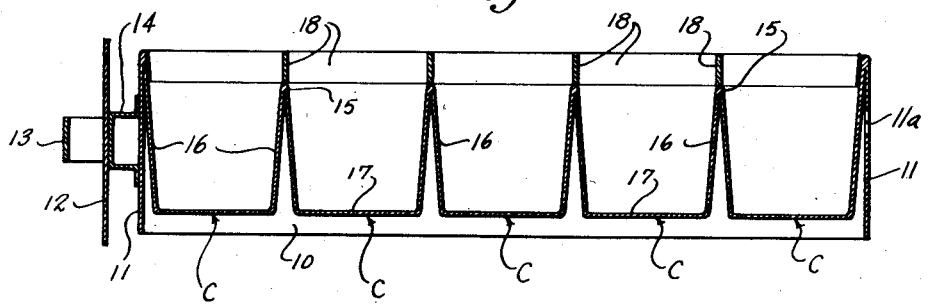
Inventor
Charles G. Wheeland.
Attorney.

May 16, 1933.  C. G. WHEELAND  1,909,030
ICE MAKING TRAY
Filed April 19, 1930  2 Sheets-Sheet 2

Inventor
Charles G. Wheeland.

Attorney.

Patented May 16, 1933

1,909,030

UNITED STATES PATENT OFFICE

CHARLES G. WHEELAND, OF LOS ANGELES, CALIFORNIA

ICE MAKING TRAY

Application filed April 19 1930. Serial No. 445,602.

My invention relates to molds for forming ice, particularly to ice making trays used in domestic refrigerating devices for forming convenient blocks or "cubes" of ice.

The usual type of tray for such a purpose is a flat bottomed rectangular pan divided into compartments by intersecting vertical walls. In service it is filled with water and deposited in a suitable freezing compartment within the refrigerating device. When removed therefrom with contents solidified the pan is placed upside down on a suitable surface and hot water is poured over the bottom and sides to facilitate removal of the frozen contents. The hot water readily severs the bond between the blocks and the surfaces of the pan exposed to the hot water, but heat from the water does not penetrate the partitions between the compartments to an effective extent unless the hot water is poured directly upon the ice or unless the duration of the hot water application to the bottom of the pan is extended, both of which unduly melt the ice. The general practice is to use the hot water as briefly as possible and then to remove the blocks by tapping or jarring the pan. More often than not, the tapping is necessarily so vigorous that it not only injures or dents the pan but also the released blocks are expelled with annoying force.

My invention consists of a tray comprising individual liquid-tight cells spaced from each other and interjoined at their tops to form a liquid-tight pan structure within a frame, the bottoms of the cells lying in a plane above the bottom of the frame.

The rate of freezing the contents of such a tray is rapid because solidification begins at the surface exposed and substantially all six surfaces of each compartment are directly exposed to the freezing medium, whereas in the old type of tray the corner compartments have only four surfaces directly exposed, the remaining end and side compartments only three surfaces, and the interior compartments but two surfaces—top and bottom.

The application of hot water to the bottom of my tray, for the purpose of releasing the blocks of ice contained, is quickly effective, because five surfaces of each compartment are in direct contact with the hot water, whereas in the old construction only three surfaces of the corner compartments, two surfaces of the remaining end and side compartments, and one surface of the interior compartments, are directly affected.

My invention provides for more economically and efficiently utilizing the hot water than in the case of the usual type of tray. The hot water submerging the cells is confined by the outside walls of the frame and escapes at a suitably retarded rate through a small drain hole in one end of the frame.

An important feature of my invention is a separator frame or grille normally resting removably within the tray with its members substantially serving as rims of the individual cells extended. By such an arrangement the removal of the blocks from the tray is a controlled, orderly procedure, with no likelihood of any of the ice cubes being knocked to the floor.

These and other objects and advantages of my invention will be clear from the description which follows:

In the drawings—

Fig. 1 is a perspective view of my invention in its normal upright position;

Fig. 2 is a longitudinal vertical section through the tray;

Figure 3:
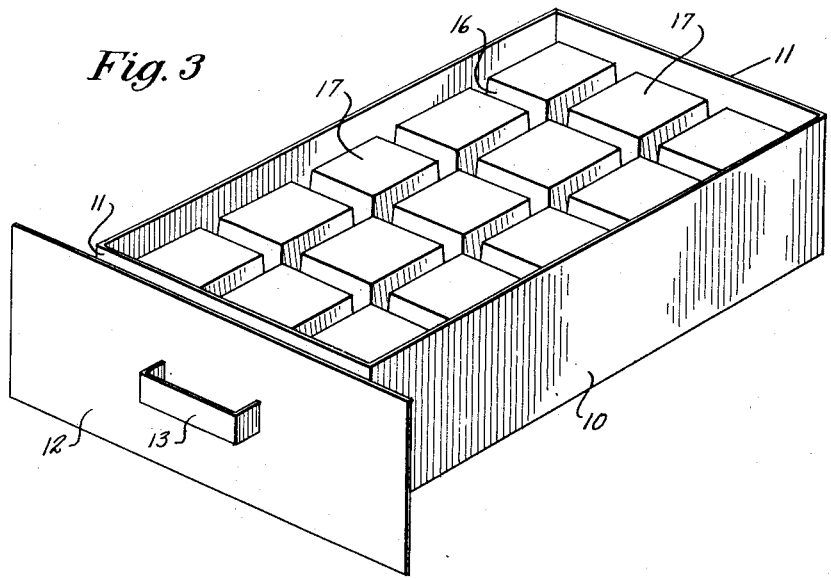
Fig. 3 is a perspective view of the tray upside down.

My invention may be of the usual rectangular configuration, the frame comprising sides 10 and ends 11. Preferably the invention is fabricated from material having a high coefficient of thermal conductivity, such as copper, zinc or brass, suitably plated.

For convenience, a panel 12, having a handle 13, serves to close the opening of the freezing compartment of the refrigerating device, when the tray is inserted therein. This is commonly attached to the front end of such a tray by means of clips 14; the spaced relation permitting cold air of the freezing compartment to affect the front end of the tray equally with the sides and back end.

The frame is spanned and may be sealed liquid tight by a plurality of cells individually designated by the letter C, which are interjoined at their tops 15. To facilitate removal of the solidified contents, the cells are preferably of frusto-pyramidal shape, the sides 16 tapering inward to rectangular bottoms 17, smaller in area than the rectangular open tops of the cells. The bottoms of the cells lie above the plane of the bottom of the frame. In the rear end of the frame, just below the line of juncture with the web of cells, is a small drain hole 11a.

The plane of the cell tops is below the top edge of the frame, to provide space within the frame for a removable separator frame or grille comprising intersecting separating members 18. This separator frame normally rests upon and registers with the tops of the multiple cells.

When the tray is in service, water is poured into the tray assembled as shown in Fig. 1, and the tray is deposited in a freezing compartment.

Figure 4:
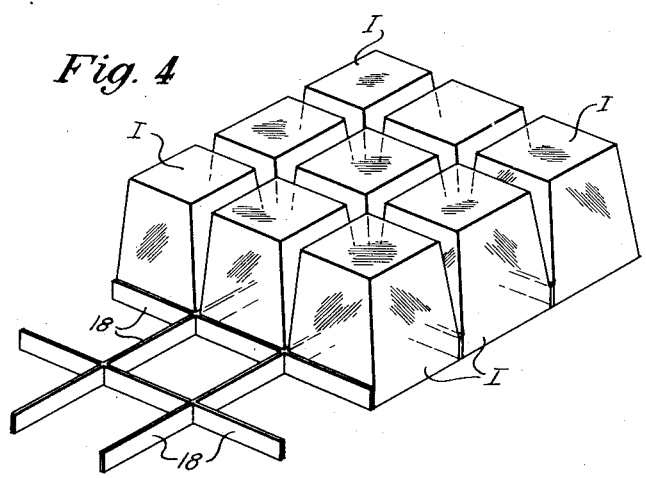
Fig. 4 is a perspective view of the separator frame and some of the ice cubes after removal from the tray.

When the contents of the cells are properly solidified, the tray is removed from the freezing compartment and placed on a suitable surface such as a drain board or in a pan in an upsidedown position, shown in Fig. 3. Hot water is then poured into the frame, filling the spaces around each cell, and submerging the bottoms of the cells, which are all below the rim of the frame in this reversed position. When the tray has been suitably thawed, generally by the time the first application of water has drained away through the drain hole 11a, the tray proper, with its integral web of cells, is lifted free from the ice blocks and the separator frame. Inasmuch as the heat of the thawing water is not readily transmitted to the members 18, the ice blocks remain with the separator frame and may be conveniently removed therefrom. Fig. 4 shows such a frame, from which some of the ice blocks, individually designated I, have been removed.

It will be noted, by considering Fig. 2 in an upsidedown position, that the hot water has direct contact with the sides and bottoms of the cells, but the members of the separator frame and more remote, consequently, the ice blocks cling longer to the separator frame than to the tray proper. If the ice blocks are not thawed away from the separator frame, they are, nevertheless, easily removed from the separator frame, because of the small surface presented to each block and the accessibility of the individual blocks, separated, as they are, by convenient spaces. Obviously the hot water application has some effect on the edges of the separator frame normally contiguous to the cell rims.

In describing the preferred form of my invention, I reserve the right to all modifications in structure or form that are properly within the scope of the claims appended hereto.

Having thus described my invention, I claim:

1. In combination with a refrigerating device, an ice-making tray, comprising: an open bottom frame; a plurality of open-topped cells having individual walls; and webs interjoining the tops of the cells and the top edges of the frame to form a liquid seal across the frame, said frame having a drain hole below said seal.

2. In combination with a refrigerating device, an ice-making tray, comprising: a frame; a plurality of open-topped cells having individual walls; webs interjoining the cells and the frame; and a removable grille normally resting on the webs with its apertures substantially registering with the cells.

3. In combination with a refrigerating device, an ice-making tray, comprising: a frame; a plurality of open-topped cells having individual walls; webs interjoining the tops of the cells and the frame; and a removable grille normally resting on the webs with its apertures substantially registering with the cells.

4. In combination with a refrigerating device, an ice-making tray, comprising: a frame; a plurality of open-topped cells having individual walls; webs interjoining the rims of the cells to form a liquid seal across the frame; and a removable grille resting on the web with its apertures substantially registering with the cells.

5. In combination with a refrigerating device, an ice-making tray, comprising: a frame; a plurality of open-topped cells having individual walls; webs interjoining the rims of the cells to form a liquid seal across the frame, said frame having a drain hole below said seal; and a removable grille normally resting on the web with its apertures substantially registering with the cells.

6. An ice making tray, comprising a rectangular frame; a plurality of open topped cells having tapered individual walls and webs interjoining the tops of the cells and the frame, the top of the frame forming a continuous wall around and above the tops of the cells, and the bottom of the cells being above the bottom edge of the frame; and a removable grill normally resting on the webs, within the frame, with its apertures registering with the cells.

7. An ice making tray, comprising a rectangular frame; a plurality of open topped water-tight cells within said frame and joined to the frame, the top of the frame forming a continuous wall around and above the tops of the cells and the bottoms of the cells being above the bottom edge of the frame; and a removable grille normally resting on the walls separating the cells, within the frame, with its apertures registering with the cells.

8. An ice making tray comprising: a rectangular frame; a plurality of open topped water-tight cells within said frame, the bottoms of the cells being above the bottom edge of the frame, and the rims of the cells being interconnected and connected with the top rim of the frame to form a water-tight seal therewith, whereby the frame when reversed serves as a receptacle adapted to contain water submerging the sides and bottoms of the cells, said frame having a drain hole dimensioned to permit water to escape from said receptacle at a retarded rate.

In witness that I claim the foregoing I have hereunto subscribed my name this 19th day of March, 1930.

CHARLES G. WHEELAND.